United States Patent
Lee (10) Patent No.: US 8,011,822 B1
(45) Date of Patent: Sep. 6, 2011

(54) PLASTIC FRAME, BACKLIGHT MODULE, DISPLAY DEVICE AND METHOD FOR ASSEMBLING THE SAME

(75) Inventor: Ping Lee, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 12/862,783

(22) Filed: Aug. 25, 2010

(30) Foreign Application Priority Data

Aug. 2, 2010 (TW) .............................. 99125627 A (51) Int. Cl.
  *F21V 7/04* (2006.01)
(52) U.S. Cl. ... 362/632; 362/97.1; 362/97.2; 362/217.1; 362/633; 362/634; 349/58
(58) Field of Classification Search ........ 362/97.1–97.2, 362/217.1, 217.11–217.17, 362, 632–634; 349/58
See application file for complete search history.

(56) References Cited

U.S. PATENT DOCUMENTS

2008/0170416 A1* 7/2008 Yuan et al. ............... 362/633

FOREIGN PATENT DOCUMENTS

| CN | 200910160848.X | 7/2009 |
| JP | 2003296023 | 10/2003 |
| TW | 525791 | 3/2003 |
| TW | I289711 | 11/2007 |

* cited by examiner

*Primary Examiner* — Stephen F Husar
*Assistant Examiner* — Meghan Dunwiddie
(74) *Attorney, Agent, or Firm* — Winston Hsu; Scott Margo (57) ABSTRACT

A plastic frame includes a main body and a protruding portion protruding from the main body. The main body has a first horizontal surface, a second horizontal surface, a first recess and a second recess, wherein the first horizontal surface is opposite to the second horizontal surface. The protruding portion has a first vertical surface and a second vertical surface, wherein the first vertical surface is opposite to the second vertical surface. The first recess connects the first vertical surface and the first horizontal surface and the second recess connects the second vertical surface and the second horizontal surface.

20 Claims, 11 Drawing Sheets

PLASTIC FRAME, BACKLIGHT MODULE, DISPLAY DEVICE AND METHOD FOR ASSEMBLING THE SAME

BACKGROUND OF THE INVENTION

1. Field of the Invention

The invention relates to a plastic frame and, more particularly, to a plastic frame capable of effectively reducing an impact force applied to a panel.

2. Description of the Prior Art

Figure 1:
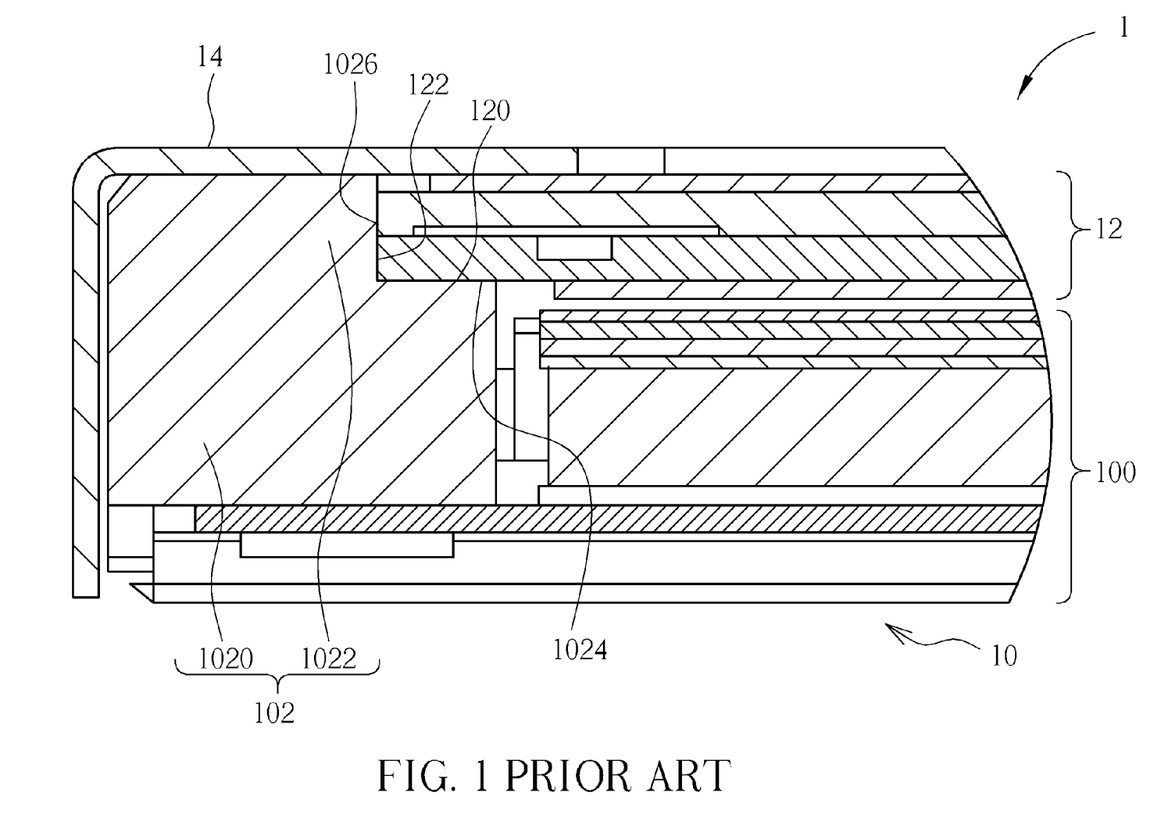
FIG. 1 is a partial cross section view illustrating a display device of the prior art.

Referring to FIG. 1, FIG. 1 is a partial cross section view illustrating a display device 1 of the prior art. As shown in FIG. 1, the display device 1 comprises a backlight module 10, a display panel 12 and a metal frame 14. The backlight module 10 comprises a backlight element 100 and a plastic frame 102. Generally speaking, the backlight module 100 may consist of a light source (e.g. a light emitting diode), a reflective sheet, a diffuser sheet, a prism sheet, a light guide plate, and so on. The plastic frame 102 is disposed on a periphery region of the backlight element 100. The display panel 12 can be a liquid crystal display panel which is disposed on the plastic frame 102. The metal frame 14 is disposed on the display panel 12 and the backlight module 10.

As shown in FIG. 1, the plastic frame 102 comprises a main body 1020 and a protruding portion 1022 protruding from the main body 1020. The main body 1020 has a horizontal surface 1024, and the protruding portion 1022 has a vertical surface 1026. Furthermore, the display panel 12 has a horizontal abutting surface 120 and a vertical abutting surface 122. When the display panel 12 is assembled on the plastic frame 102, the horizontal abutting surface 120 abuts against the horizontal surface 1024, and the vertical abutting surface 122 abuts against the vertical surface 1026. Since the structure of the aforesaid plastic frame 102 does not have buffer capability, the periphery region of glass substrate of the display panel 12 are commonly taken apart or broken due to a great impact force during shock test of the display device 1. Accordingly, the display device 1 will fail in the shock test.

SUMMARY OF THE INVENTION

Therefore, one objective of the invention is to provide a plastic frame, a backlight module with the plastic frame and a display device with the plastic frame. When the display device is impacted by an external force, the plastic frame of the invention is capable of effectively reducing the impact force applied to the panel, so as to solve the aforesaid problem.

According to one embodiment of the invention, a plastic frame comprises a main body and a protruding portion protruding from the main body. The main body has a first horizontal surface, a second horizontal surface, a first recess and a second recess, wherein the first horizontal surface is opposite to the second horizontal surface. The protruding portion has a first vertical surface and a second vertical surface, wherein the first vertical surface is opposite to the second vertical surface. The first recess connects the first vertical surface and the first horizontal surface, and the second recess connects the second vertical surface and the second horizontal surface.

According to another embodiment of the invention, a backlight module comprises a backlight element and the aforesaid plastic frame. The plastic frame is disposed on a periphery region of the backlight element.

According to another embodiment of the invention, a display device comprises the aforesaid backlight module, a display panel and a metal frame. The display panel is disposed on the plastic frame. The display panel has a horizontal abutting surface and a vertical abutting surface, wherein the horizontal abutting surface abuts against the first horizontal surface and the vertical abutting surface abuts against the first vertical surface. The metal frame is disposed on the display panel and the backlight module. The metal frame has a horizontal corresponding surface and a vertical corresponding surface, wherein the horizontal corresponding surface is spaced from the first horizontal surface and the second horizontal surface correspondingly, and the vertical corresponding surface is spaced from the first vertical surface and the second vertical surface correspondingly.

According to another embodiment of the invention, a method for assembling a display device comprises steps of: providing the aforesaid backlight module; assembling a display panel on the plastic frame, wherein the display panel has a horizontal abutting surface and a vertical abutting surface, the horizontal abutting surface abuts against the first horizontal surface, and the vertical abutting surface abuts against the first vertical surface; and assembling a metal frame on the display panel and the backlight module, wherein the metal frame has a horizontal corresponding surface and a vertical corresponding surface, the horizontal corresponding surface is spaced from the first horizontal surface and the second horizontal surface correspondingly, and the vertical corresponding surface is spaced from the first vertical surface and the second vertical surface correspondingly.

As mentioned in the above, the invention forms two recesses on opposite sides of the protruding portion of the plastic frame. When the impact force is applied from the display panel to the protruding portion, the protruding portion will deform along a direction opposite to the display panel, so as to effectively reduce the impact force applied from the display panel to the plastic frame.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
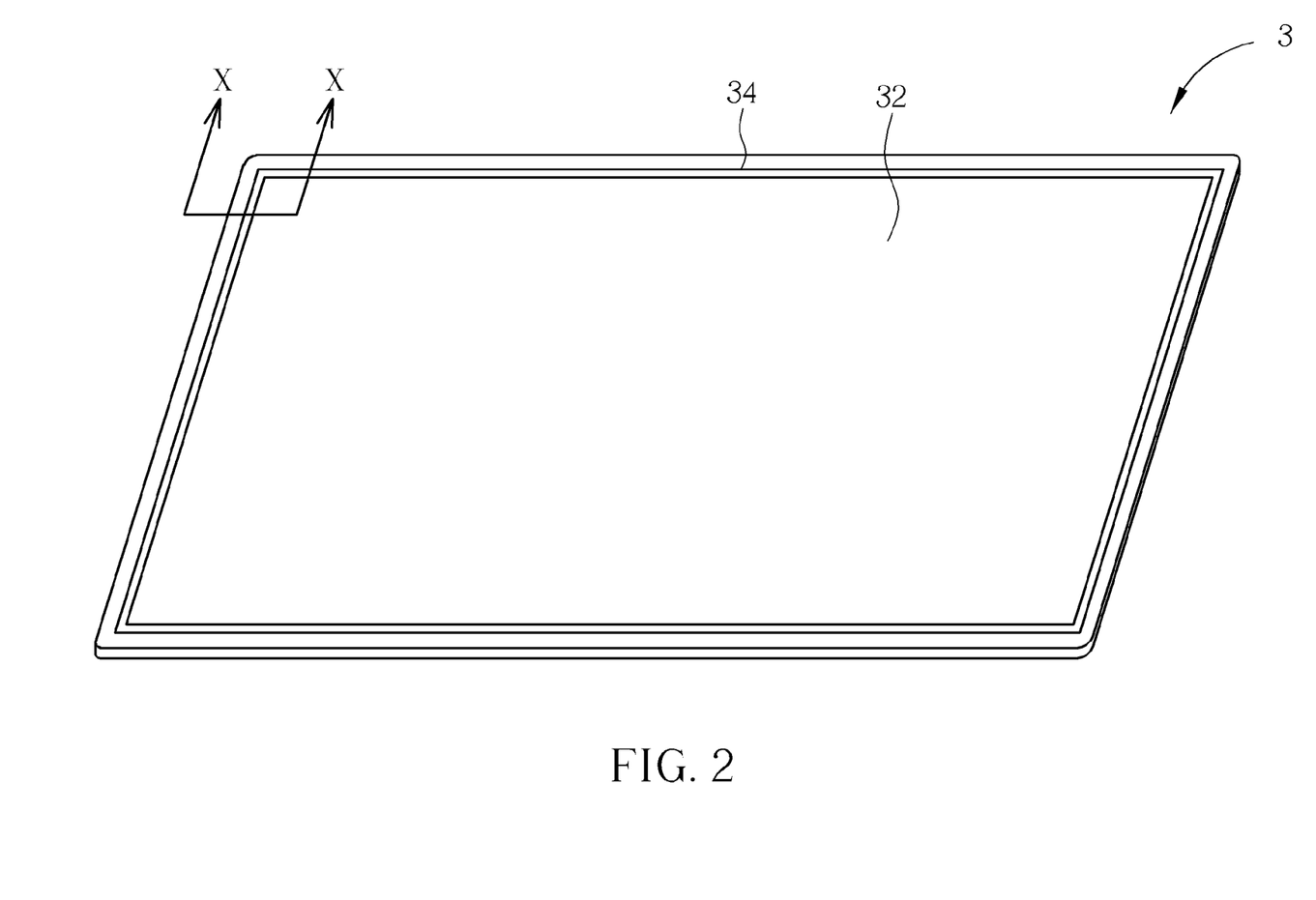
FIG. 2 is a perspective view illustrating a display device according to one embodiment of the invention.
Figure 3:
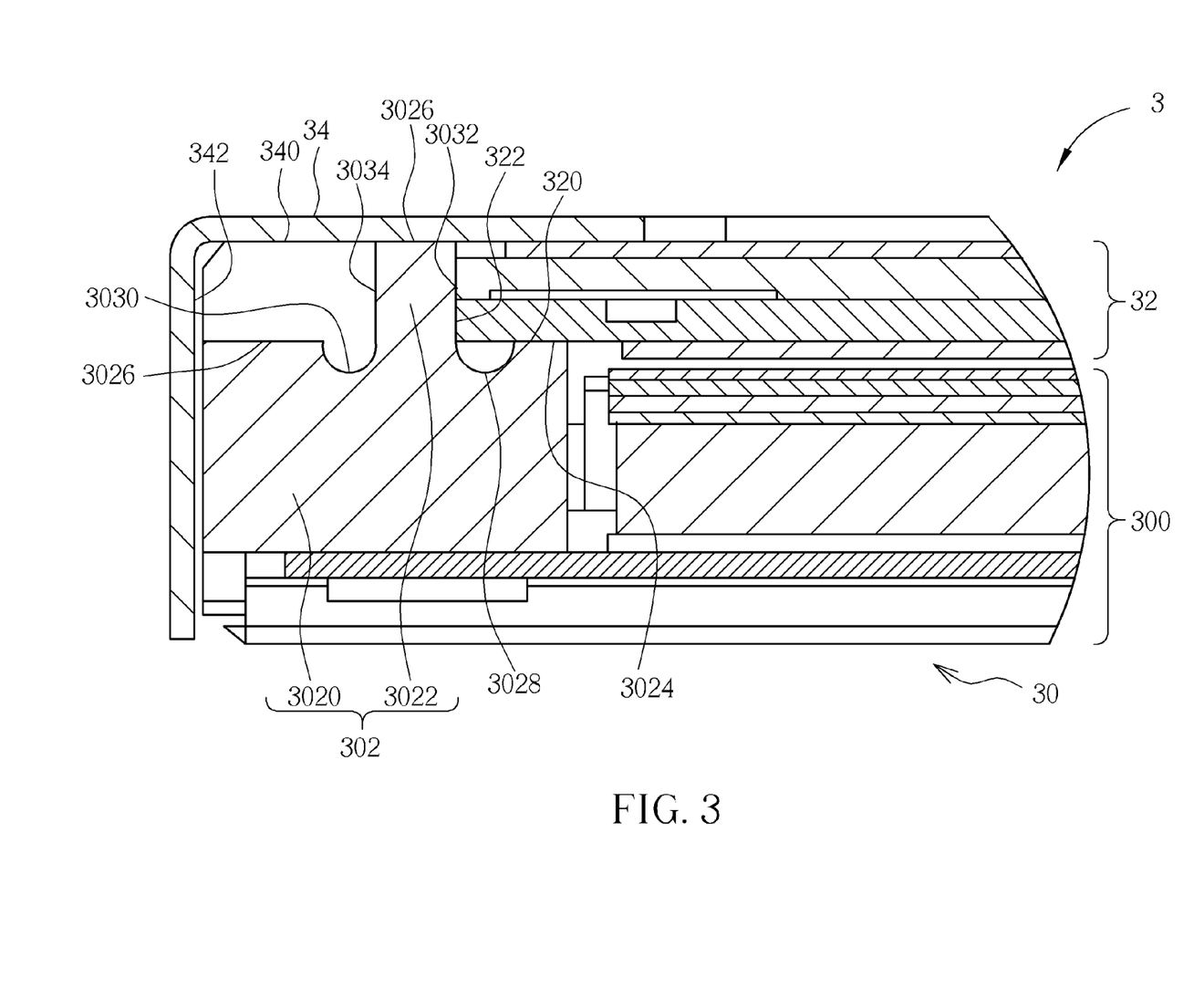
FIG. 3 is a partial cross section view illustrating the display device along line X-X shown in FIG. 2.

Referring to FIG. 2 and FIG. 3, FIG. 2 is a perspective view illustrating a display device 3 according to one embodiment of the invention, and FIG. 3 is a partial cross section view illustrating the display device 3 along line X-X shown in FIG. 2. As shown in FIG. 2 and FIG. 3, the display device 3 comprises a backlight module 30, a display panel 32 and a metal frame 34. The backlight module 30 comprises a backlight element 300 and a plastic frame 302. Generally speaking, the backlight element 300 may consist of a light source (e.g. a light emitting diode), a reflective sheet, a diffuser sheet, a prism sheet, a light guide plate and so on. The plastic frame 302 is disposed on a periphery region of the backlight element 300. The display panel 32 can be a liquid crystal display panel which is disposed on the plastic frame 302. The metal frame 34 is disposed on the display panel 32 and the backlight module 30.

As shown in FIG. 3, the plastic frame 302 comprises a main body 3020 and a protruding portion 3022 protruding from the main body 3020. The main body 3020 has a first horizontal surface 3024, a second horizontal surface 3026, a first recess 3028 and a second recess 3030, wherein the first horizontal surface 3024 is opposite to the second horizontal surface 3026. In this embodiment, the protruding portion 3022 is located between the first horizontal surface 3024 and the second horizontal surface 3026, and the first horizontal surface 3024 is coplanar with the second horizontal surface 3026. The protruding portion 3022 has a first vertical surface 3032 and a second vertical surface 3034, wherein the first vertical surface 3032 is opposite to the second vertical surface 3034, the first vertical surface 3032 is perpendicular to the first horizontal surface 3024, and the second vertical surface 3034 is perpendicular to the second horizontal surface 3026. The first recess 3028 connects the first vertical surface 3032 and the first horizontal surface 3024. The first recess 3028 is located at a corner between the first vertical surface 3032 and the first horizontal surface 3024. The second recess 3030 connects the second vertical surface 3034 and the second horizontal surface 3026. The second recess 3030 is located at a corner between the second vertical surface 3034 and the second horizontal surface 3026. In other words, the first recess 3028 and the second recess 3030 are located at opposite sides of the protruding portion 3022 respectively, and the first recess 3028 is opposite to the second recess 3030.

In this embodiment, cross sections of the first recess 3028 and the second recess 3030 are arc-shaped. However, in another embodiment, cross sections of the first recess 3028 and the second recess 3030 can be polygon-shaped (e.g. rectangular). Furthermore, cross section of one of the first recess 3028 and the second recess 3030 can be arc-shaped, and that of the other can be polygon-shaped. In other words, the cross sections of the first recess 3028 and the second recess 3030 can be determined based on practical applications.

As shown in FIG. 3, the display panel 32 has a horizontal abutting surface 320 and a vertical abutting surface 322. When the display panel 32 is assembled on the plastic frame 302, the horizontal abutting surface 320 abuts against the first horizontal surface 3024 and the vertical abutting surface 322 abuts against the first vertical surface 3032. Furthermore, the metal frame 34 has a horizontal corresponding surface 340 and a vertical corresponding surface 342. When the metal frame 34 is assembled on the display panel 32 and the backlight module 30, the horizontal corresponding surface 340 is spaced from the first horizontal surface 3024 and the second horizontal surface 3026 correspondingly, and the vertical corresponding surface 342 is spaced from the first vertical surface 3032 and the second vertical surface 3034 correspondingly. In other words, the horizontal corresponding surface 340 does not contact the first horizontal surface 3024 and the second horizontal surface 3026, and the vertical corresponding surface 342 does not contact the first vertical surface 3032 and the second vertical surface 3034.

Figure 4:
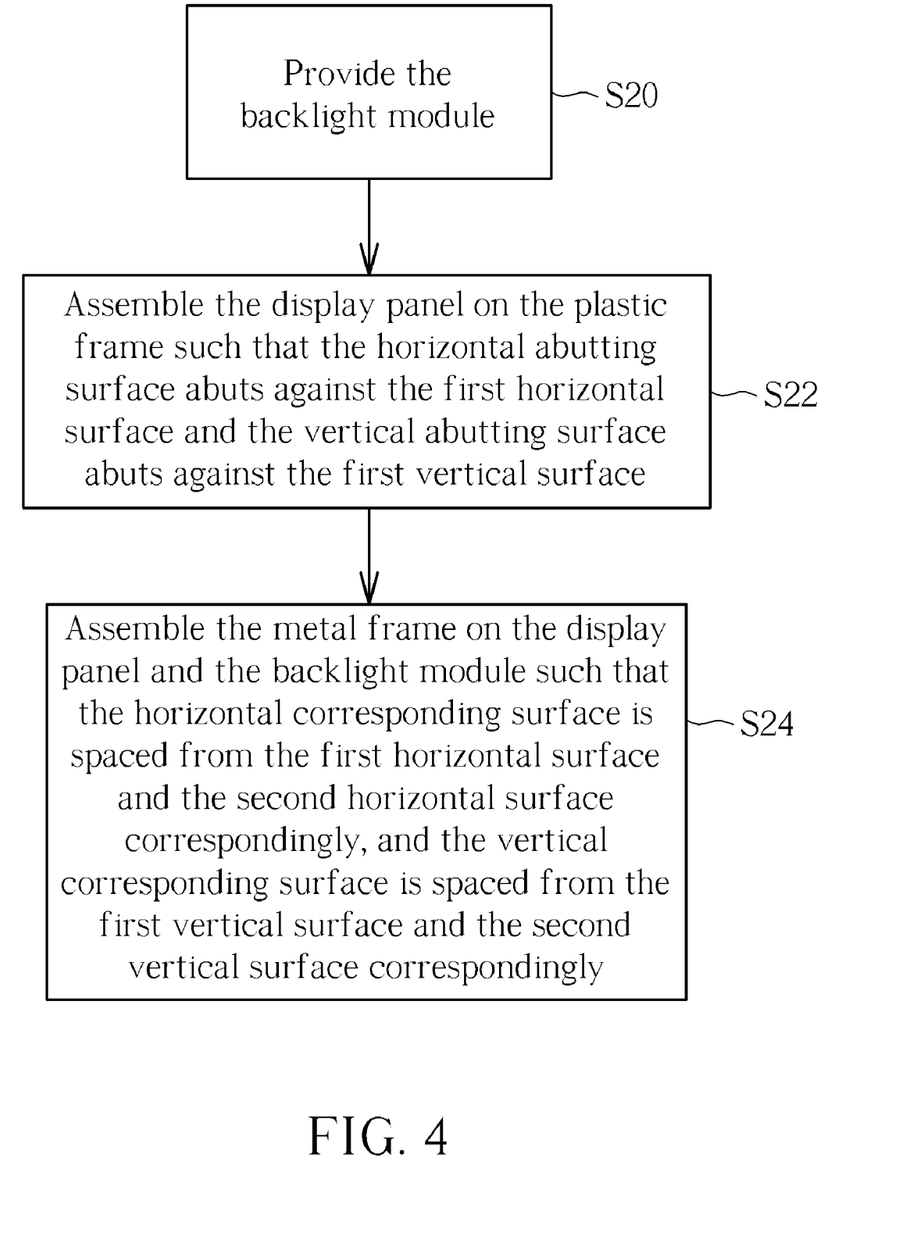
FIG. 4 is a flow chart illustrating a method for assembling the display device according to one embodiment of the invention.
Figure 5:
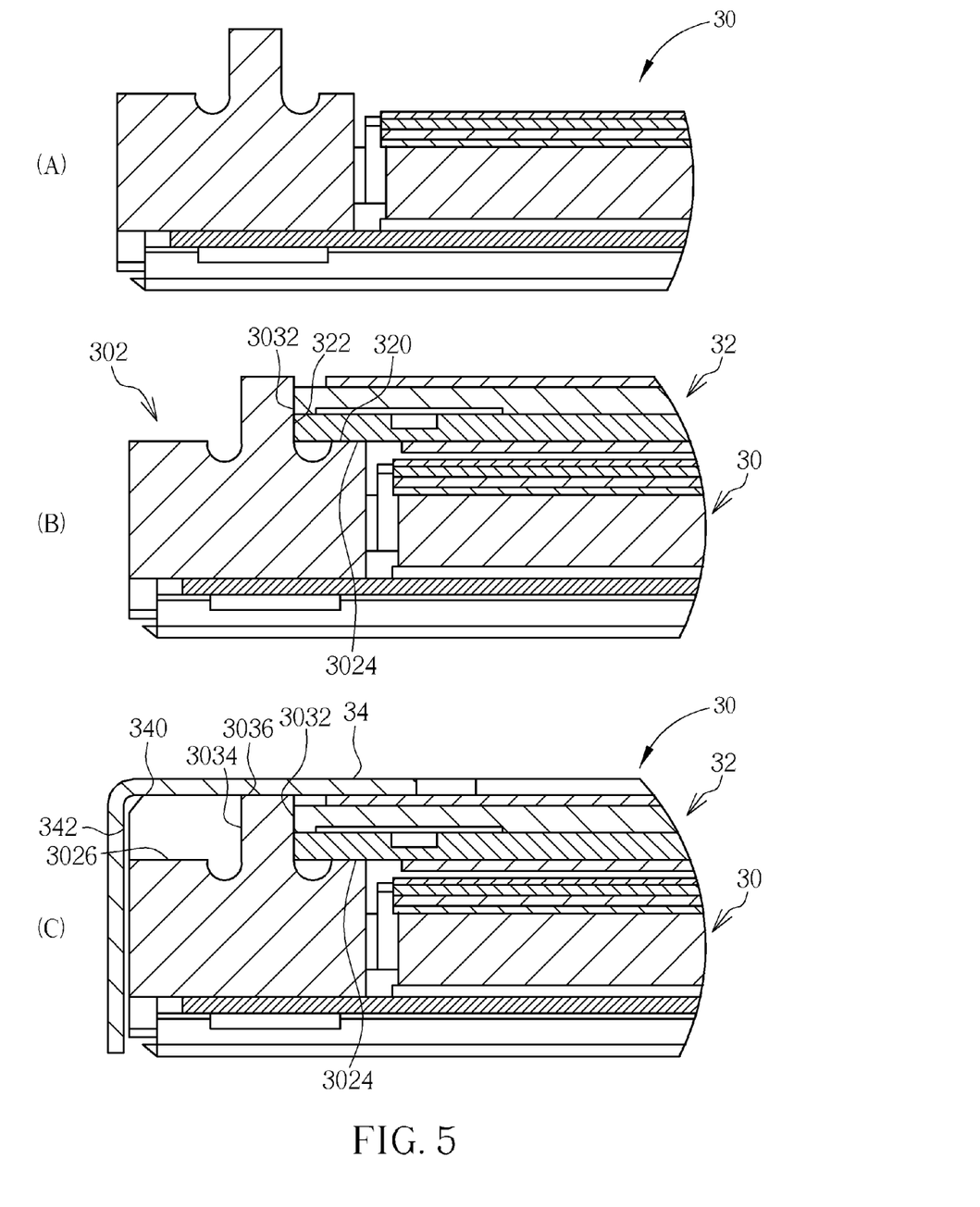
FIG. 5 is a schematic diagram illustrating the method for assembling the display device shown in FIG. 4.

Referring to FIG. 4 and FIG. 5, FIG. 4 is a flow chart illustrating a method for assembling the display device 3 according to one embodiment of the invention, and FIG. 5 is a schematic diagram illustrating the method for assembling the display device 3 shown in FIG. 4. First of all, step S20 is performed to provide the aforesaid backlight module 30 as shown in FIG. 5(A). Afterward, step S22 is performed to assemble the display panel 32 on the plastic frame 302 such that the horizontal abutting surface 320 abuts against the first horizontal surface 3024 and the vertical abutting surface 322 abuts against the first vertical surface 3032, as shown in FIG. 5(B). Finally, step S24 is performed to assemble the metal frame 34 on the display panel 32 and the backlight module 30 such that the horizontal corresponding surface 340 is spaced from the first horizontal surface 3024 and the second horizontal surface 3026 correspondingly, and the vertical corresponding surface 342 is spaced from the first vertical surface 3032 and the second vertical surface 3034 correspondingly, as shown in FIG. 5(C). Accordingly, the aforesaid display device 3 is completely assembled.

Figure 6:
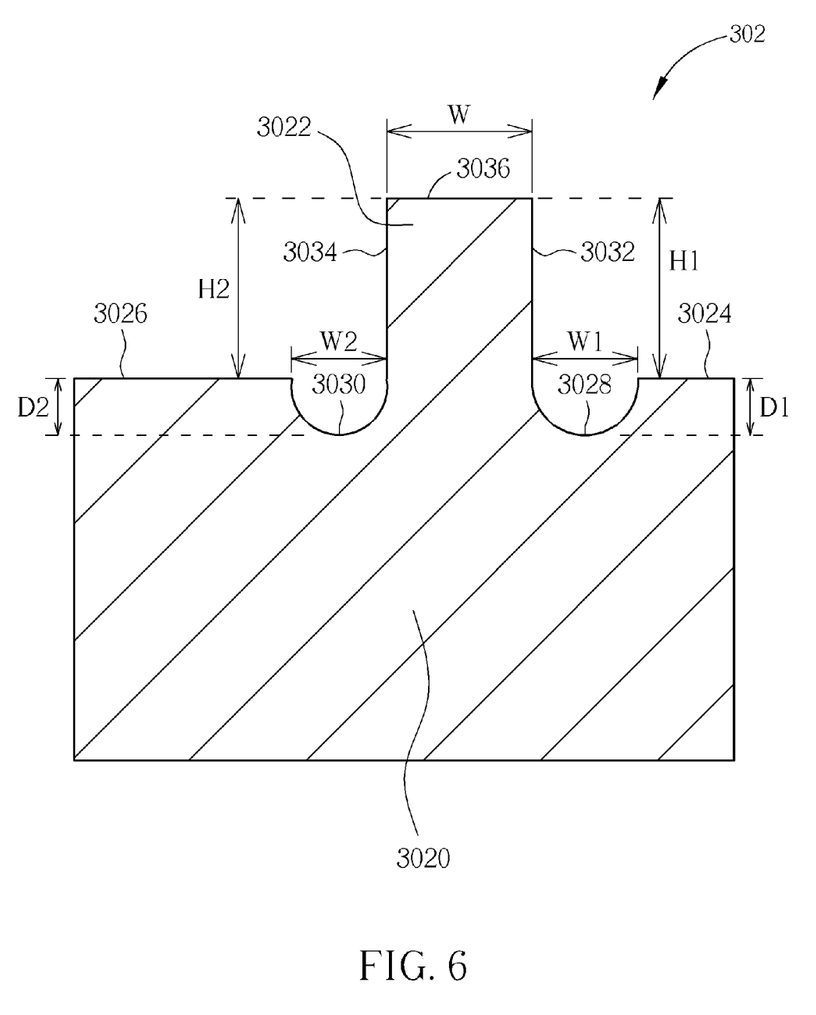
FIG. 6 is an enlarged view illustrating the plastic frame shown in FIG. 3.

Referring to FIG. 6, FIG. 6 is an enlarged view illustrating the plastic frame 302 shown in FIG. 3. As shown in FIG. 6, a height H1 of the first vertical surface 3032 is defined as a distance from a top surface 3036 of the protruding portion 3022 to the first horizontal surface 3024, and a height H2 of the second vertical surface 3034 is defined as a distance from the top surface 3036 of the protruding portion 3022 to the second horizontal surface 3026. The top surface 3036 and/or an upper surface of the display panel 32 opposite to the horizontal abutting surface 320 may contact with the horizontal corresponding surface 340 as shown in FIG. 3 and FIG. 5(C). A depth D1 of the first recess 3028 is defined as a distance from the first horizontal surface 3024 to a bottom of the first recess 3028, and a depth D2 of the second recess 3030 is defined as a distance from the second horizontal surface 3026 to a bottom of the second recess 3030. A width W of the protruding portion 3022 is defined as a distance from the first vertical surface 3032 to the second vertical surface 3034. Furthermore, the first recess 3028 has a width W1 and the second recess 3030 has a width W2, as shown in FIG. 6.

In this embodiment, the height H1 of the first vertical surface 3032 or the height H2 of the second vertical surface 3034 can be between 0.5 mm and 2 mm, and the depth D1 of the first recess 3028 or the depth D2 of the second recess 3030 can be between 0.3 mm and 1 mm. Accordingly, a ratio of the height H1 of the first vertical surface 3032 (or the height H2 of the second vertical surface 3034) and the depth D1 of the first recess 3028 (or the depth D2 of the second recess 3030) is between 0.5 and 6.67. Furthermore, the width W of the protruding portion 3022 can be between 0.5 mm and 1.5 mm, and the width W1 of the first recess 3028 or the width W2 of the second recess 3030 can be between 0.3 mm and 1 mm. Accordingly, a ratio of the width W of the protruding portion 3022 and the width W1 of the first recess 3028 (or the width W2 of the second recess 3030) is between 0.5 and 5. Preferably, the height H1 of the first vertical surface 3032 or the height H2 of the second vertical surface 3034 can be, but not limited to, 1.27 mm, the depth D1 of the first recess 3028 or the depth D2 of the second recess 3030 can be, but not limited to, 0.4 mm, the width W of the protruding portion 3022 can be, but not limited to, 1 mm, and the width W1 of the first recess 3028 or the width W2 of the second recess 3030 can be, but not limited to, 0.3 mm. In this embodiment, the depth D1 of the first recess 3028 can be identical, but not limited, to the depth D2 of the second recess 3030, and the width W1 of the first recess 3028 can be identical, but not limited, to the width W2 of the second recess 3030.

Figure 7:
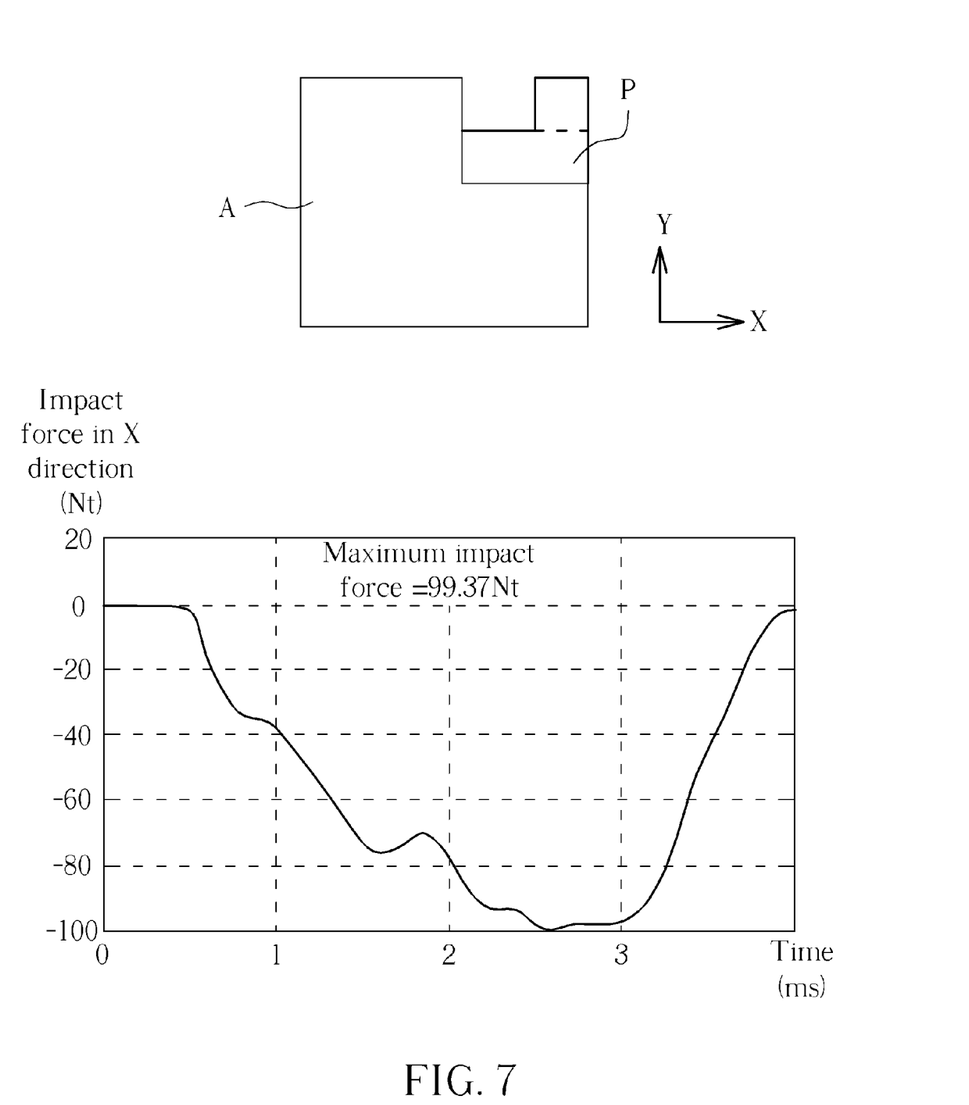
FIG. 7 to FIG. 11 are diagrams illustrating simulation models and shock test charts for five types of plastic frames correspondingly.
Figure 8:
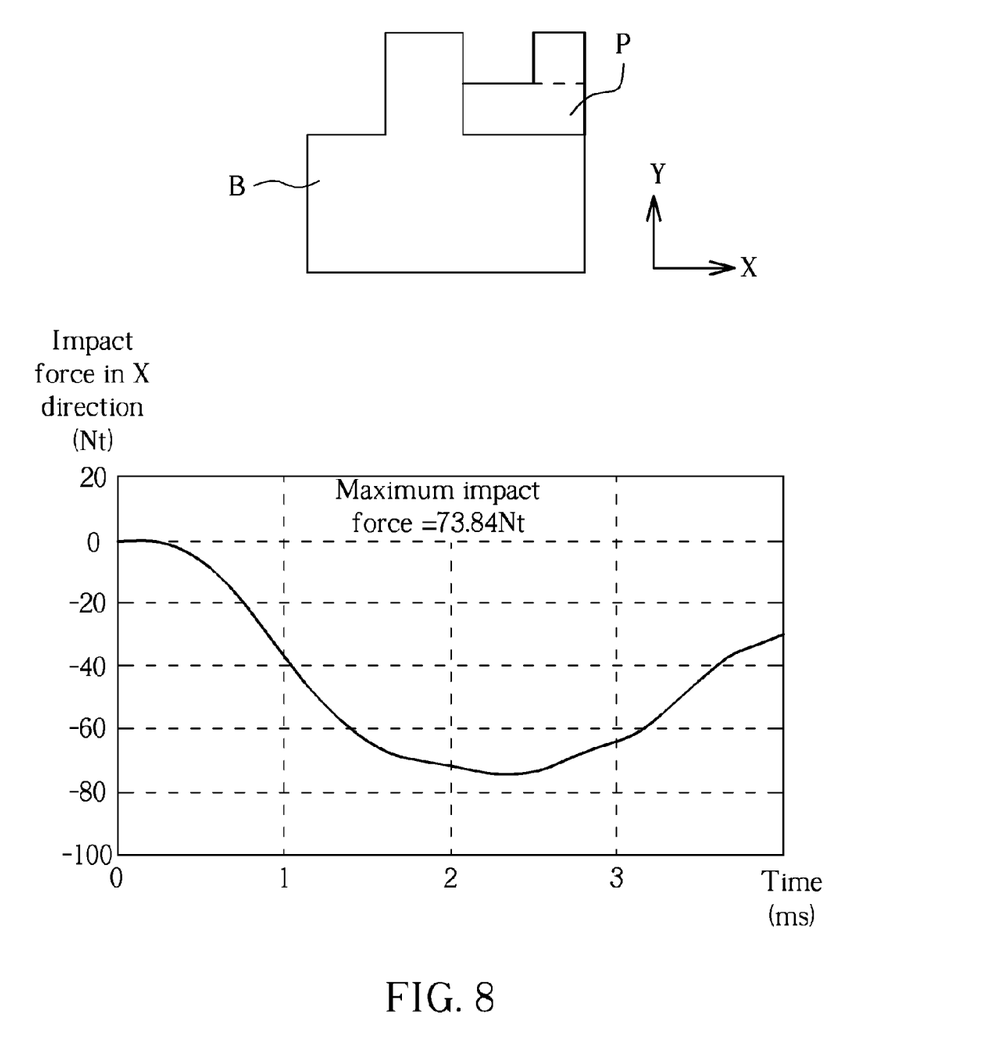
Figure 9:
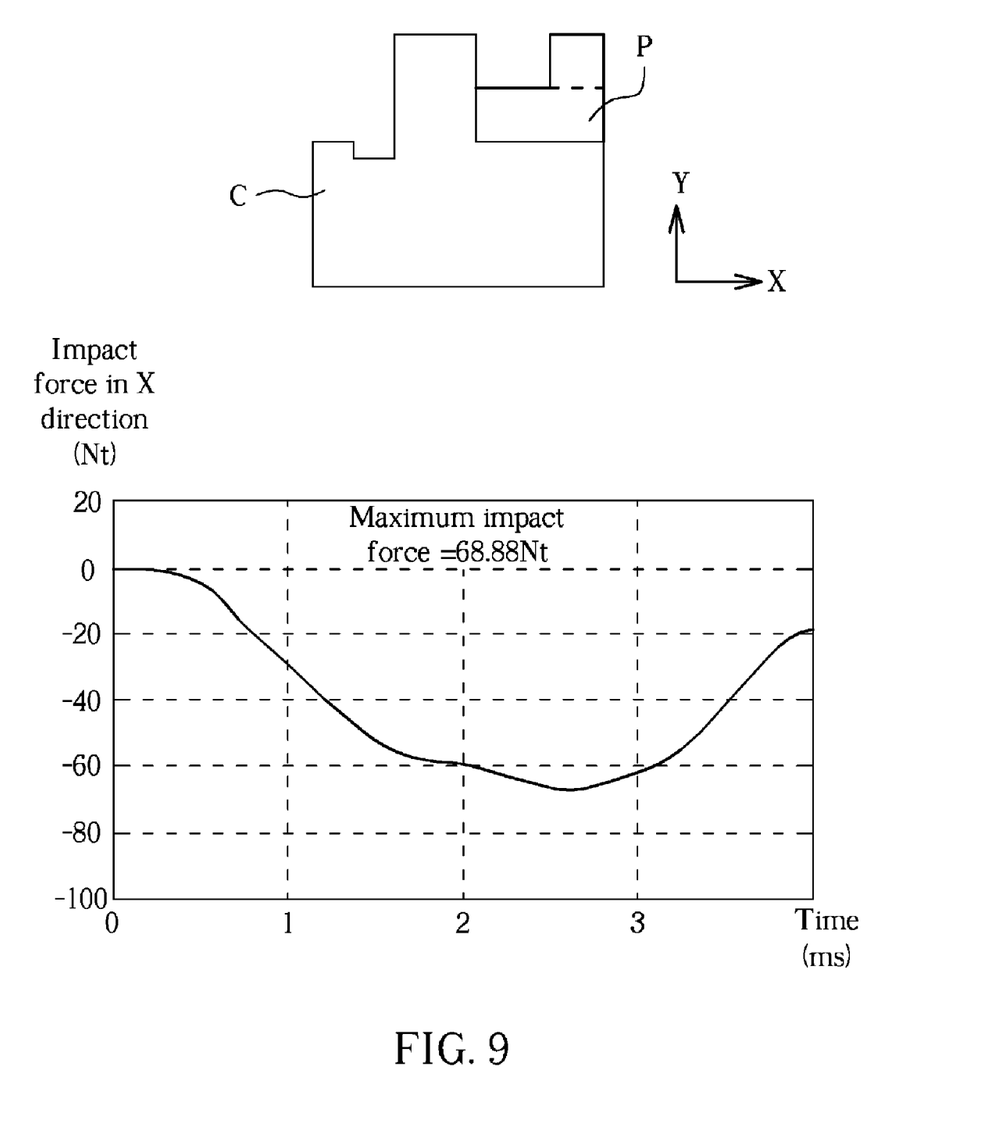
Figure 10:
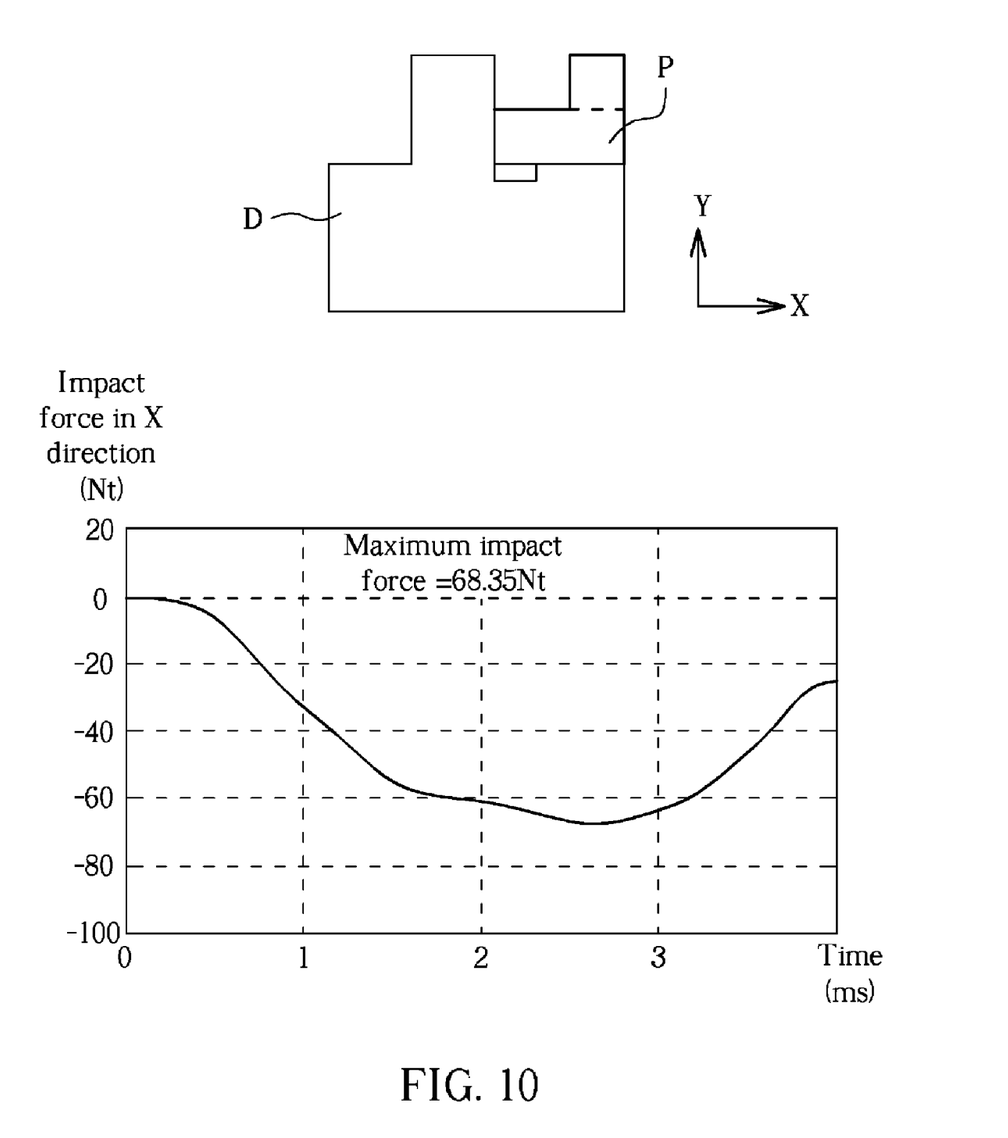
Figure 11:
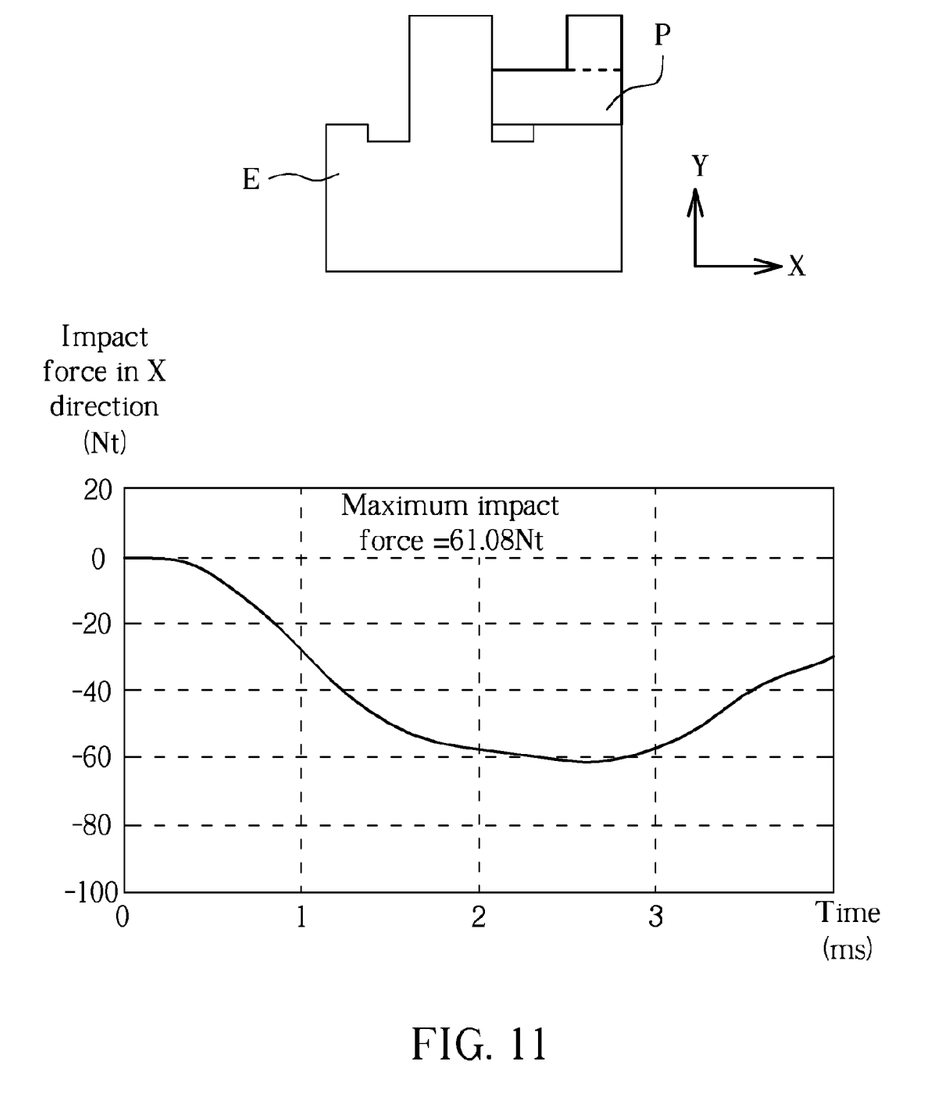

Referring to FIG. 7 to FIG. 11, FIG. 7 to FIG. 11 are diagrams illustrating simulation models and shock test charts for five types of plastic frames correspondingly. A plastic frame A in FIG. 7 is a simulation model of the conventional plastic frame 102 in FIG. 1. Both of the plastic frame A in FIG. 7 and a plastic frame B in FIG. 8 do not have any recesses. A thickness of a protruding portion of the plastic frame B is thinner than that of a protruding portion of the plastic frame A, so the protruding portion of the plastic frame B has a little buffer capability. A plastic frame C in FIG. 9 has one single recess away from a display panel P. A plastic frame D in FIG. 10 has one single recess close to the display panel P. A plastic frame E is a simulation model of the aforesaid plastic frame 302 of the invention. Furthermore, the plastic frame B, the plastic frame C and the plastic frame D are just used for simulation purpose. It should be noticed that the rectangular recesses in FIG. 9 to FIG. 11 are just used for simulation purpose, and the shapes of the recesses of the invention are not limited to rectangular.

As shown in FIG. 7, the display panel P is disposed on the plastic frame A and an impact force of 210 G within 3 ms (i.e. 2450 m/s) is applied for the shock test. Consequently, the maximum impact force applied to the plastic frame A and the display panel P is 99.37 Nt (in absolute value). As shown in FIG. 8, the display panel P is disposed on the plastic frame B and an impact force of 210 G within 3 ms is applied for the shock test. Consequently, the maximum impact force applied to the plastic frame B and the display panel P is 78.34 Nt (in absolute value). As shown in FIG. 9, the display panel P is disposed on the plastic frame C and an impact force of 210 G within 3 ms is applied for the shock test. Consequently, the maximum impact force applied to the plastic frame C and the display panel P is 68.88 Nt (in absolute value). As shown in FIG. 10, the display panel P is disposed on the plastic frame D and an impact force of 210 G within 3 ms is applied for the shock test. Consequently, the maximum impact force applied to the plastic frame D and the display panel P is 68.35 Nt (in absolute value). As shown in FIG. 11, the display panel P is disposed on the plastic frame E and an impact force of 210 G within 3 ms is applied for the shock test. Consequently, the maximum impact force applied to the plastic E and the display panel P is 61.08 Nt (in absolute value).

The shock test results of FIG. 7 to FIG. 11 are arranged in the following table 1 and table 2. As shown in table 1 and table 2, when the display device is impacted by an external force, the plastic frame E can reduce the impact force applied to itself and the display panel P more effectively.

TABLE 1

|  | maximum impact force (Nt) | compared to plastic frame A | compared to plastic frame B |
| --- | --- | --- | --- |
| plastic frame A | 99.37 |  |  |
| plastic frame B | 73.84 | −24.69% |  |
| plastic frame C | 68.88 | −30.68% | −7.96% |
| plastic frame D | 68.35 | −31.22% | −8.67% |
| plastic frame E | 61.08 | −38.53% | −18.39% |

TABLE 2

|  | maximum impact force (Nt) | compared to plastic frame C | compared to plastic frame D |
| --- | --- | --- | --- |
| plastic frame A | 99.37 |  |  |
| plastic frame B | 73.84 |  |  |
| plastic frame C | 68.88 |  |  |
| plastic frame D | 68.35 | −0.77% |  |
| plastic frame E | 61.08 | −11.32% | −10.64% |

Compared to the plastic frame A (i.e. the plastic frame 102) of the prior art and the simulation models including the plastic frames B, C, and D of the invention, the invention forms two recesses on opposite sides of the protruding portion of the plastic frame E (i.e. the plastic frame 302) such that the protruding portion will deform along a direction opposite to the display panel, so as to effectively reduce the impact force applied from the display panel to the plastic frame E.

Those skilled in the art will readily observe that numerous modifications and alterations of the device and method may be made while retaining the teachings of the invention.

What is claimed is:

1. A plastic frame comprising:
   a main body having a first horizontal surface, a second horizontal surface, a first recess and a second recess, the first horizontal surface being opposite to the second horizontal surface; and
   a protruding portion protruding from the main body, the protruding portion having a first vertical surface and a second vertical surface, the first vertical surface being opposite to the second vertical surface;
   wherein the first recess connects the first vertical surface and the first horizontal surface, and the second recess connects the second vertical surface and the second horizontal surface.

2. The plastic frame of claim 1, wherein a cross section of the first recess or the second recess is polygon-shaped or arc-shaped.

3. The plastic frame of claim 1, wherein a depth of the first recess or the second recess is between 0.3 mm and 1 mm.

4. The plastic frame of claim 1, wherein a ratio of a height of the first vertical surface or the second vertical surface and a depth of the first recess or the second recess is between 0.5 and 6.67.

5. The plastic frame of claim 1, wherein a ratio of a width of the protruding portion and a width of the first recess or the second recess is between 0.5 and 5.

6. The plastic frame of claim 1, wherein a width of the first recess or the second recess is between 0.3 mm and 1 mm.

7. The plastic frame of claim 1, wherein a depth of the first recess is identical to a depth of the second recess.

8. The plastic frame of claim 1, wherein a width of the first recess is identical to a width of the second recess.

9. A backlight module comprising:
   a backlight element; and
   a plastic frame, disposed on a periphery region of the backlight element, comprising:
      a main body having a first horizontal surface, a second horizontal surface, a first recess and a second recess, the first horizontal surface being opposite to the second horizontal surface; and
      a protruding portion protruding from the main body, the protruding portion having a first vertical surface and a second vertical surface, the first vertical surface being opposite to the second vertical surface;

wherein the first recess connects the first vertical surface and the first horizontal surface, and the second recess connects the second vertical surface and the second horizontal surface.

10. The backlight module of claim 9, wherein a cross section of the first recess or the second recess is polygon-shaped or arc-shaped.

11. The backlight module of claim 9, wherein a depth of the first recess or the second recess is between 0.3 mm and 1 mm.

12. The backlight module of claim 9, wherein a ratio of a height of the first vertical surface or the second vertical surface and a depth of the first recess or the second recess is between 0.5 and 6.67.

13. The backlight module of claim 9, wherein a ratio of a width of the protruding portion and a width of the first recess or the second recess is between 0.5 and 5.

14. The backlight module of claim 9, wherein a width of the first recess or the second recess is between 0.3 mm and 1 mm.

15. The backlight module of claim 9, wherein a depth of the first recess is identical to a depth of the second recess.

16. The backlight module of claim 9, wherein a width of the first recess is identical to a width of the second recess.

17. A display device comprising:

the backlight module of claim 9;

a display panel disposed on the plastic frame, the display panel having a horizontal abutting surface and a vertical abutting surface, the horizontal abutting surface abutting against the first horizontal surface and the vertical abutting surface abutting against the first vertical surface; and a metal frame disposed on the display panel and the backlight module, the metal frame having a horizontal corresponding surface and a vertical corresponding surface, the horizontal corresponding surface being spaced from the first horizontal surface and the second horizontal surface correspondingly, and the vertical corresponding surface being spaced from the first vertical surface and the second vertical surface correspondingly.

18. The display device of claim 17, wherein the protruding portion further comprises a top surface contacts with the horizontal corresponding surface.

19. The display device of claim 17, wherein the display panel further comprises an upper surface opposite to the horizontal abutting surface, and the upper surface contacts with the horizontal corresponding surface.

20. A method for assembling a display device comprising steps of:

providing the backlight module of claim 9;

assembling a display panel on the plastic frame, the display panel having a horizontal abutting surface and a vertical abutting surface, the horizontal abutting surface abutting against the first horizontal surface and the vertical abutting surface abutting against the first vertical surface; and assembling a metal frame on the display panel and the backlight module, the metal frame having a horizontal corresponding surface and a vertical corresponding surface, the horizontal corresponding surface being spaced from the first horizontal surface and the second horizontal surface correspondingly, and the vertical corresponding surface being spaced from the first vertical surface and the second vertical surface correspondingly.

* * * * *